Aug. 11, 1964

T. D. GRAYBEAL 3,144,595

CONTROL APPARATUS FOR ALTERNATING CURRENT
DYNAMOELECTRIC MOTORS

Filed Feb. 27, 1961

INVENTOR.
TROY D. GRAYBEAL
BY
ATTORNEYS.

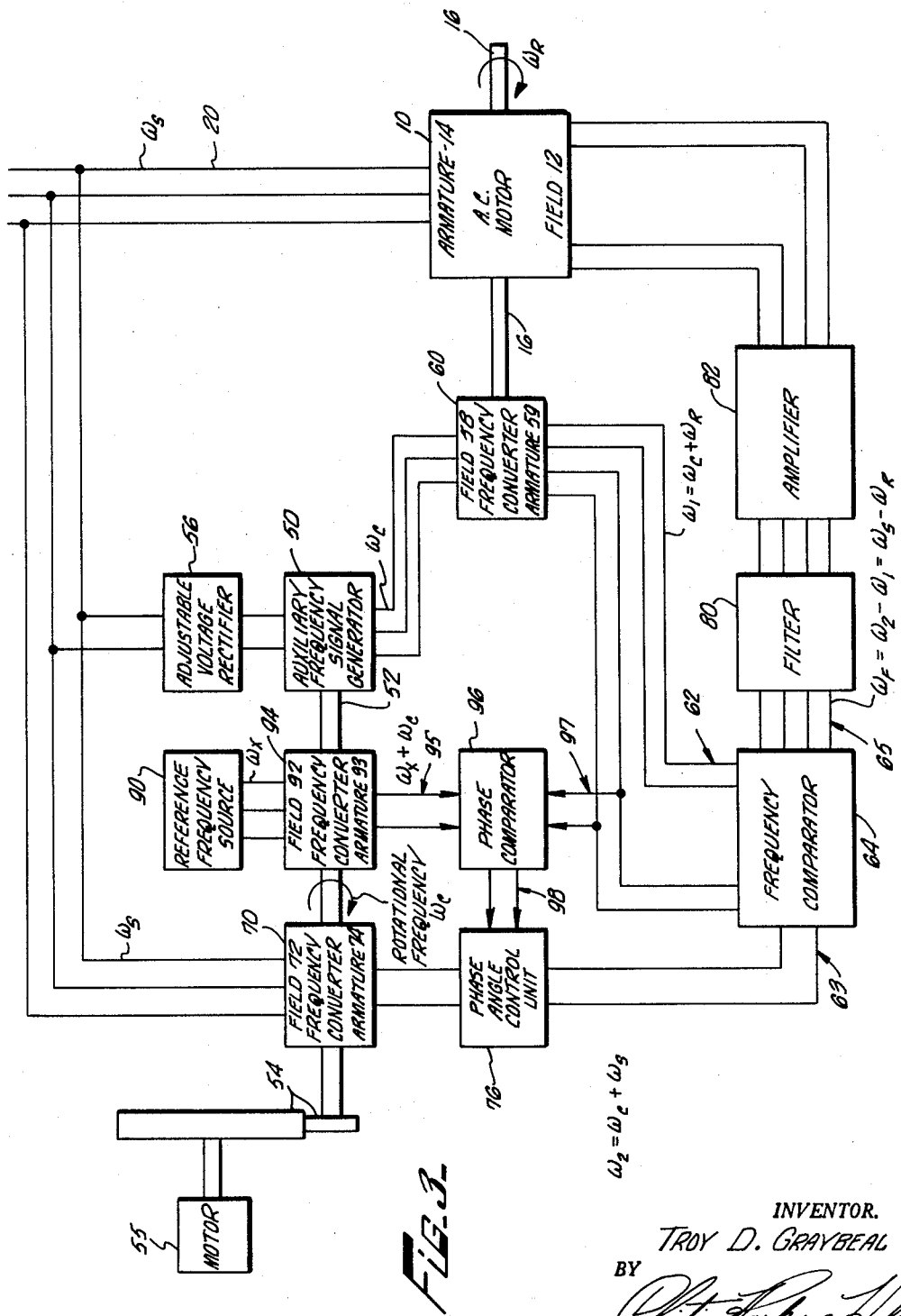

United States Patent Office 3,144,595
Patented Aug. 11, 1964

---

3,144,595
CONTROL APPARATUS FOR ALTERNATING CURRENT DYNAMOELECTRIC MOTORS
Troy D. Graybeal, Anaheim, Calif., assignor to Lear Siegler, Inc., a corporation of Delaware
Filed Feb. 27, 1961, Ser. No. 91,926
13 Claims. (Cl. 318—197)

The present invention relates to apparatus for controlling alternating current dynamoelectric motors and more particularly to apparatus for controlling the speed of such motors.

Control systems for alternating current (A.C.) dynamoelectric machines are known in which various characteristics of the machine including operating speed are controlled by applying A.C. excitation to the field windings to control the direction and speed of rotation of the magnetic field for the armature. In such systems, the speed of the rotating magentic flux set up by the rotor is made up of two components; (1) the direction and speed of the mechanical rotation of the field windings relative to the armature and, (2) the phase and frequency of the A.C. excitation voltage applied to the field windings. The sum of these two components must at all times be equal to the speed of the magnetic field set up by the stator of the machine to develop torque effectively. The A.C. machines utilized with such systems are generally constructed with a non-salient pole field and armature structure.

The field excitation voltage or current applied to controlled flux A.C. excited induction machines has a frequency equal to the difference between the frequency of the current in the stator and the rotational frequency of the machine. The rotational frequency of the machine is equal to the speed of rotation of the rotor in revolutions per second, times the number of pairs of poles for which the machine is wound. The difference between the frequency of the current in the armature or stator and the rotational frequency is generally referred to as the slip frequency because it is always equal to the armature frequency times the slip, where the slip is expressed as a per unit value and is equal to the difference between the synchronous speed and the actual speed divided by the synchronous speed. Apparatus for providing A.C. excitation at slip frequency is disclosed in the following copending applications of Troy D. Graybeal and Charles Philip Cardeiro, which are assigned to the assignee of the present invention. (1) "Control Apparatus for Alternating Current Dynamoelectric Machines," Serial No. 81,389, filed Jan. 9, 1961, and (2) "Control Apparatus for Alternating Current Dynamoelectric Machines," Serial No. 91,925, filed Feb. 27, 1961.

The present invention relates to an apparatus for controlling the A.C. excitation to an induction or alternating current motor to accurately control the speed at which the motor operates. Motors having a constant or controlled operating speed have many uses in industry. Direct current motors with complex control apparatus have been generally used in the past to provide controlled speed drives. Alternating current motors have also been employed in variable speed drives for example of the Scherbius and Kramer types. Prior art apparatus for controlling the speed of alternating current motors is generally not satisfactory where precise speed control is desired. Furthermore such prior art speed controlled alternating current motors generally operate at a relatively low efficiency and poor power factor.

The above disadvantages of conventional prior art apparatus for controlling the speed of alternating current motors are overcome by the present invention. In accordance with the present invention, an apparatus is provided for accurately controlling the speed of an alternating current motor having a polyphase field winding and an armature. A source of alternating current energizing potential is connected to the armature of the motor. Means responsive to the frequency of the alternating current energizing potential and to the speed of the motor are provided for producing polyphase regulating signals of slip frequency. The polyphase regulating signals are applied to the field windings of the motor by means of suitable amplifiers. A source of reference frequency signals are provided having a frequency representative of a preselected speed of the motor. The reference frequency may be fixed to provide a constant speed drive or may be varied to provide a variable speed drive in accordance with any desired function. Means responsive to the reference frequency signals and to the speed of the motor are provided for controlling the time phase relationship of the polyphase regulating signals to control the torque developed by the motor so that the motor operates at the preselected speed as determined by the reference frequency.

The invention is described in more detail in reference to the accompanying drawings in which:

FIG. 3 is a block diagram of an apparatus illustrating another embodiment of the present invention.

Figure 1:
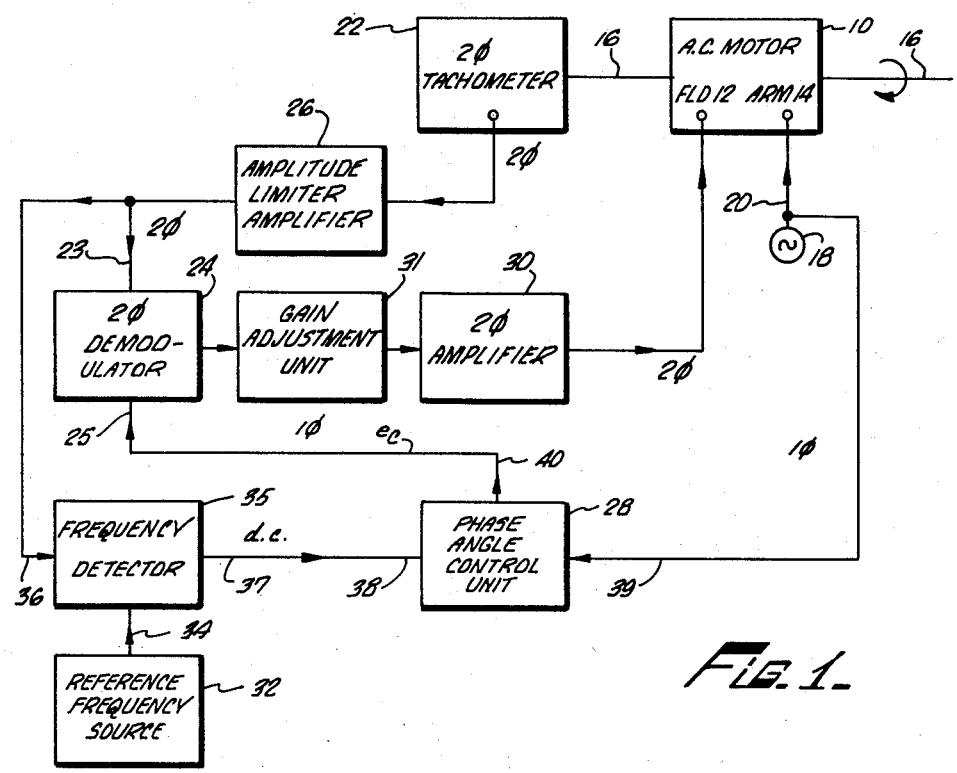
FIG. 1 is a block diagram of an apparatus constructed in accordance with the present invention.

Referring now to the drawings, and more particularly to FIG. 1, there is illustrated an A.C. dynamoelectric or induction motor 10 with a polyphase field winding 12, a polyphase armature 14 and a shaft 16. A suitable load (not shown) may be coupled to the shaft 16 to be driven by the motor 10. A polyphase source of energizing potential 18 such as a conventional alternator is connected to the armature 14 of the motor 10 through a polyphase transmission line 20. The field windings 12 of the motor may be wound on the rotor and connected to conventional slip rings (not shown) for external excitation as will be more fully explained.

A speed measuring device such as a two-phase tachometer 22 is connected to the shaft 16 of the motor 10 for providing an output signal representative of the speed of the motor 10. The output signal from the tachometer 22 is applied to one input circuit 23 of a two-phase phase sensitive demodulator 24 through an amplitude limiter amplifier 26. An A.C. control signal $e_C$ (illustrated as single phase) which is derived from the source of energizing potential 18 through a phase angle control unit 28 is applied to a second input circuit 25 of the demodulator 24. The demodulator 24 obtains the algebraic difference between the signals applied to the two input circuits 23 and 25 thereof and provides an output in the form of two-phase regulating signals which are applied to the input of a two-phase amplifier 30 through a gain adjustment unit 31. The regulating signals produced by the demodulator have a frequency equal to the difference between the frequencies of the output signals from the tachometer 22 and the source of energizing potential 18. Since the tachometer 22 produces a signal having a frequency representative of the speed of rotation of the A.C. motor 10, the regulating signals have a frequency representative (or in this case equal to) the slip frequency of the A.C. motor 10.

A source of speed reference frequency signals 32 having a reference frequency representative of a preselected speed of the motor 10 is coupled to one input circuit 34 of a frequency detector 35. A second input circuit 36 of the frequency detector 35 is coupled to the output of the amplifier 26. The frequency detector 35 compares the frequency of the signals applied to the input circuits 34 and 36 thereof and produces a direct current output signal in the output circuit 37 which has an amplitude representative of the difference in the frequencies of the two input signals and a polarity determined by the relative frequency of the input signals. The output signal from the frequency detector 35 has one polarity when the frequency of the signal on the input circuit 36 is higher than the reference frequency and another polarity when the frequency of the signal on the input circuits 36 is lower than the reference frequency. Thus the frequency detector 35 compares the output frequency of the tachometer 22 which is representative of the speed of the motor 10 to the reference frequency and produces an output signal whenever the two frequencies differ. The output signal from the frequency detector 35 is applied to a control input circuit 38 of the phase angle control unit 28 to control the time phase relationship between the signals on the signal input circuit 39 and signal output circuit 40 of the phase angle control unit. The phase angle control unit 28 may be of any well known type and serves to control the phase shift between the A.C. signals on the input and output circuits 39 and 40 in accordance with the polarity and magnitude of the D.C. signal applied to the circuit 38 thereof.

In the operation of the apparatus of FIG. 1 when a load is applied to the shaft 16 of the motor 10, the motor slows down slightly. This in turn provides a greater difference between the actual speed of the motor as measured by the tachometer 22 and the reference frequency. This greater difference results in increasing the amplitude of the output signal from the frequency detector 35 which causes a greater phase shift in the control signal $e_C$ applied to the input circuit 25 of the demodulator 24. This increased phase shift increases the space phase angle between the stator magnetic flux set up by the armature current and the rotor magnetic flux set up by the field excitation current in the motor 10 and thereby increases the magnitude of the torque developed by the motor 10. This action increases the speed of the motor 10 to approximately the preselected speed as determined by the reference frequency reference. The apparatus of FIG. 1 results in a certain amount of speed droop with increased loading of the motor 10 as is shown by the curves 44 in FIG. 2. This speed droop is characteristic of all constant speed drives (i.e. squirrel cage induction motors etc.). The amount of speed droop is determined by the sensitivity of the speed measuring and control elements.

When the load on the motor 10 is decreased, the motor speeds up slightly which decreases the difference between the actual speed as measured by the tachometer 22 and the preselected speed as determined by the reference source 32. This decreases the magnitude of the output signals from the frequency detector 35 which in turn decreases the phase shift produced by the phase angle control unit 28 of the control signal $e_C$ to reduce the torque developed by the motor 10 and thereby maintain speed of the motor at substantially the preselected speed.

A true synchronous speed drive, that is one in which there is no speed droop, may be obtained by replacing the frequency detector 35 in the apparatus of FIG. 1 with a phase comparator or detector. Such a synchronous type drive is illustrated in the apparatus of FIG. 3.

Referring now to the apparatus of FIG. 3, an auxiliary frequency signal generator 50 is coupled through a shaft 52 and a pair of gears 54 to a suitable motor 55 for supplying a polyphase auxiliary high frequency signal having a frequency $\omega_C$. The auxiliary frequency signal generator 50 may be similar to a synchronous generator wherein the field winding is energized by direct current through an adjustable voltage rectifier 56 which may be connected to the transmission line 20 as shown. The adjustable voltage rectifier 56 controls the magnitude of the field excitation and the magnetic field for the auxiliary frequency signal generator 50 and thereby controls the amplitude of the three-phase auxiliary frequency signal produced by the generator 50. The polyphase output signal from the generator 50 is applied to a polyphase (three-phase) field winding 58 of a frequency converter 60. The frequency converter 60 is in the form of an induction machine similar to the machine 10 and has a polyphase (two-phase) armature 59. The frequency converter 60 is coupled to the shaft 16 of the motor 10 for rotation therewith. Thus the rotor of the frequency converter 60 rotates at a speed representative of the rotational frequency $\omega_R$ of the A.C. machine 10. The field winding 58 may be secured to the rotor of the frequency converter 60 and the rotor may be arranged to rotate in the opposite direction of the rotating magnetic field set up by the auxiliary frequency signal generator 50. The excitation of the field winding 58 thus induces a first command signal in the armature 59 which has a frequency $\omega_1$ equal to the sum of the auxiliary frequency $\omega_C$ and the rotational frequency $\omega_R$.

The first command signal which is in the form of an unmodulated two-phase signal is applied to one input circuit 62 of a frequency comparator 64. Another input circuit 63 of the frequency comparator 64 is supplied with a second unmodulated command signal having a frequency $\omega_2$ which is equal to the sum of the auxiliary frequency $\omega_C$ and the control signal $\omega_S$ of the excitation signals applied to the armature of the motor 10 as will be more fully described. The second command signal having a frequency $\omega_2$ is obtained by means of a second frequency converter 70 which is coupled to the shaft 52 of the auxiliary frequency signal generator 50. The frequency converter 70 is provided with a polyphase field winding 72 which is connected to the transmission line 20 and a single phase armature 74 which is connected through a phase angle control unit 76 to the second input circuit 63 of the frequency comparator 64. The rotor of the frequency converter 70 rotates at a speed representative of the auxiliary frequency $\omega_C$. The frequency converter 70 adds the speed of the rotor to the rotating magnetic field set up in the field winding 72 by the signals from the transmission line 20 having a frequency $\omega_S$. As a result the output from the armature 74 of the frequency converter 70 has a frequency which is equal to the sum of the auxiliary frequency $\omega_C$ and the alternating current source frequency $\omega_S$.

The frequency comparator 64 which may be a conventional mechanical or electronic phase-sensitive demodulator for obtaining the algebraic difference between the first and second command signals to produce polyphase regulating signals across an output circuit 65 which have a frequency $\omega_F$ equal to the difference frequency of the first and second command signals. The frequency $\omega_F$ is representative of (or in this case equal to) the slip frequency of the A.C. machine 10. The regulating or slip frequency output from the frequency comparator 64 is filtered by means of a suitable filter 80 and then applied to the polyphase field winding 12 of the motor 10 through a suitable amplifier 82.

To control the speed at which the motor 10 operates a source of speed reference frequency signals 90 having a frequency representative of a preselected speed of the motor is connected to the field windings 92 of a third frequency converter 94. The frequency converter 94 is provided with a single phase armature winding 93 which is connected to one input circuit 95 of a phase comparator 96. The phase comparator 96 includes a second input circuit 97 which is connected to the output of the frequency converter 60. The phase comparator 96 may be of a conventional type and provides a direct current output signal across an output circuit 98 which has a polarity determined by the relative phases between the signals applied to the two input circuits 95 and 97 and a magnitude determined by the difference between the phases of the input signals. The frequency converter 94 may be similar to the frequency converter 70 so that the armature output thereof has a frequency equal to the sum of the speed reference frequency $\omega_X$ plus the auxiliary frequency $\omega_C$. The auxiliary frequency signals cancel out in the phase compartor 96 so that the polarity and magnitude of the D.C. output of the phase comparator 96 is determined by the relative phases of the speed reference frequency signal and the rotational frequency signal from the frequency converter 60. The output of the frequency comparator 96 is applied to the phase angle control unit 76 to control the time phase relationship of the second command signal applied to the input circuit 63 of the frequency comparator 64. This controls the time phase relationship of the excitation signals applied to the field windings 12 of the A.C. motor 10 and thereby controls the torque developed by the motor 10.

Figure 2:
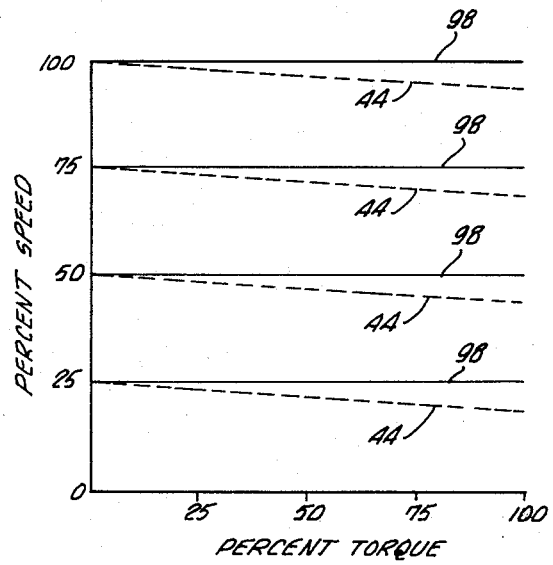
FIG. 2 is a graph illustrating the speed torque characteristics of the motor of the apparatus of FIG. 1.

In the operation of the apparatus of FIG. 3 when additional load is placed on a motor 10, the speed tends to decrease changing the relative phases between the output signals from the frequency converters 60 and 94. This results in an output signal from the frequency comparator 96 which increases the phase shift of the second command signal which in turn increases the torque developed by the motor 10 to maintain the motor at the speed determined by the reference frequency source 90. The curves 98 of FIG. 2 illustrate the operation of the apparatus of FIG. 3 for various preselected operating speeds for the motor 10.

Various modifications of the apparatus of the present invention will be readily apparent to those skilled in the art. For example, the field windings in the frequency conventers and the A.C. machine 10 may be placed on the rotor or the stator structure. The source of speed frequency reference signals may be a simple electronic oscillator or may be a separate dynamoelectric generator. The speed reference frequency may be varied to provide a variable operating speed for the motor 10 of the apparatus of FIGS. 1 and 2.

To control the operation of the A.C. motor 10 a wide speed range certain compensation circuits should be added which are described in the copending application discussed above, Serial No. 81,389, filed January 9, 1961.

If desired a current or torque limit control may be added to the apparatus of FIGS. 1 and 3 to limit the current or torque developed by the motor 10 to prevent overloading the motor.

What is claimed is:

1. In an apparatus for controlling the speed of an alternating current motor having a polyphase field winding and an armature the combination which comprises a source of alternating current energizing potential connected to the armature of the motor, means responsive to the frequency of the alternating current energizing potential and to the speed of the motor for producing polyphase regulating signals of slip frequency, means for applying the polyphase regulating signals to the field windings of the motor, a source of speed reference frequency signals having a frequency representative of a preselected speed of the motor and means responsive to the speed reference frequency signals and to the speed of the motor for controlling the time phase relationship of each of the polyphase regulating signals to control the torque developed by the motor and thereby control the speed of the motor.

2. The combination as defined in claim 1 wherein the last named means includes a frequency detector for providing a direct current output signal having a polarity and amplitude determined by the speed of the motor relative to the preselected speed so that the output signal is zero when the motor is rotating at the preselected speed.

3. The combination as defined in claim 2 wherein the last named means further includes phase angle control means under the control of the frequency detector for controlling the time phase relationship of the polyphase regulating signals in accordance with the polarity and amplitude of the output signal from the frequency detector to maintain the speed of the motor at substantially the preselected speed.

4. The combination as defined in claim 1 wherein the last named means includes a phase comparator for providing a direct current output signal having a polarity and amplitude determined by the instantaneous speed of the motor relative to the preselected speed so that the output signal is zero when the motor is rotating in synchonism with the speed frequency reference signals.

5. The combination as defined in claim 4 wherein the last named means further includes phase angle control means under the control of the phase comparator for controlling the time phase relationship of the polyphase regulating signals in accordance with the polarity and amplitude of the output signal from the frequency comparator to maintain the speed of the motor at the preselected speed.

6. In an apparatus for controlling the speed of an alternating current motor having a polyphase field winding and an armature the combination which comprises a source of alternating current energizing potential connected to the armature of the motor, speed responsive means coupled to the motor for producing a first electrical signal having a frequency representative of the speed of the motor, means for providing a second electrical signal having a frequency representative of the frequency of the alternating current energizing potential, a source of speed reference frequency signals having a frequency representative of the desired speed of the motor, signal comparing means for comparing the frequencies of the speed frequency reference signals and the first electrical signal, means under the control of the signal comparing means for controlling the time phase relationship of one of the first and second signals, frequency comparing means responsive to the first and second signals for providing a polyphase output signal of slip frequency and means for applying the output signal from the frequency comparator means to the field windings of the motor, whereby the speed of the motor is maintained at substantially the desired speed.

7. The combination as defined in claim 6 wherein the signal comparing means is a frequency detector.

8. The combination as defined in claim 7 wherein the signal comparing means is a phase detector.

9. In an apparatus for controlling the speed of an alternating current motor having a polyphase field winding and armature the combination which comprises a source of alternating current energizing potential connected to the armature of the motor, means coupled to the motor for producing a first electrical signal having a frequency representative of the speed of the motor, means for providing a second electrical signal having a frequency representative of the frequency of the alternating current energizing potential, the first and second signals having a difference frequency equal to the slip frequency of the motor, a source of speed reference frequency signals having a frequency representative of the desired speed of the motor, means for comparing the frequencies of the first signal and the speed reference frequency signals for providing a direct current output signal having a polarity and amplitude representative of the difference between the actual speed of the motor and the desired speed, frequency comparing means for obtaining the algebraic difference between the first and second signals to provide a polyphase regulating signal of slip frequency, means for applying the output signal from the frequency comparator means to the field windings of the motor, phase angle control means responsive to the output signal from the signal comparing means for controlling the time phase relationship of one of the first and second control signals in accordance with the polarity and amplitude of the output signal from the signal comparing means to maintain the speed of the motor at substantially the desired speed.

10. In an apparatus for controlling the speed of an alternating current motor having a polyphase field winding and an armature the combination which comprises a source of polyphase alternating current energizing potential connected to the armature of the motor, a tachometer coupled to the motor for providing a first electrical signal having a frequency representative of the speed of the motor, a polyphase phase-sensitive demodulator having a pair of input circuits and an output circuit for providing an output signal representative of the algebraic difference between the frequencies of the signals applied to the input circuits thereof, means for connecting the tachometer to one input circuit of the demodulator, a phase angle control unit connected between the other input circuit of the demodulator and the source of alternating current energizing potential, a source of speed reference frequency signals having a reference frequency representative of the desired speed of the motor, signal comparing means coupled between the tachometer and the source of speed reference frequency signals for providing a direct current output of one polarity when the frequency of the signals from the tachometer is higher than the reference frequency and of the opposite polarity when the frequency of the signals of the tachometer is below the reference frequency, means for connecting the output of the signal comparing means to the phase angle control unit, the phase angle unit being arranged to change the time phase relationship of the signals applied to the other input circuit of the demodulator in accordance with the polarity of the output signal from the signal comparing means to control the torque developed by the motor and maintain the speed of the motor at substantially the desired speed.

11. The combination as defined in claim 10 wherein the signal comparing means is a frequency detector.

12. The combination as defined in claim 10 wherein the signal comparing means is a phase detector.

13. In an apparatus for controlling the speed of an alternating current motor having a polyphase field winding and an armature adapted to be connected to a source of alternating current energizing potential the combination which comprises means responsive to the frequency of the alternating current energizing potential and to the speed of the motor for producing polyphase regulating signals of slip frequency, means for applying the polyphase regulating signals to the field windings of the motor, a source of speed reference frequency signals having a frequency representative of a preselected speed of the motor and means responsive to the speed reference frequency signals and to the speed of the motor for controlling the time phase relationship of the polyphase regulating signals with respect to the alternating current energizing potential applied to the armature to control the torque developed by the motor and thereby control the speed of the motor in accordance with the speed reference frequency signals.

References Cited in the file of this patent
UNITED STATES PATENTS
2,854,617    Johnson _____ Sept. 30, 1958